United States Patent [19]

Locke, Sr.

[11] Patent Number: 5,351,529
[45] Date of Patent: Oct. 4, 1994

[54] APPARATUS FOR BENCH TESTING A GOVERNOR

[75] Inventor: David E. Locke, Sr., Hillsville, Va.

[73] Assignee: The United States of America as represented by the U.S. Army Corps of Engineers, Washington, D.C.

[21] Appl. No.: 31,979

[22] Filed: Mar. 16, 1993

[51] Int. Cl.$^5$ ............................................. G01M 19/00
[52] U.S. Cl. ................................. 73/118.1; 364/426.04
[58] Field of Search ....................... 123/319, 364, 441; 73/118.1, 488, 116

[56] References Cited

U.S. PATENT DOCUMENTS

| | | | |
|---|---|---|---|
| 2,094,405 | 9/1937 | Leibing | 73/118.1 |
| 3,724,433 | 4/1973 | Voss et al. | 123/102 |
| 4,069,707 | 1/1978 | Cook et al. | 73/116 |
| 4,080,654 | 3/1978 | Walley, Jr. | 364/426 |
| 4,793,309 | 12/1988 | Hoffman et al. | 123/376 |
| 4,875,448 | 10/1989 | Dykstra | 123/352 |

Primary Examiner—Hezron E. Williams
Assistant Examiner—James M. Olsen
Attorney, Agent, or Firm—Luther A. Marsh

[57] ABSTRACT

An apparatus for testing components of an electronic engine governor is disclosed. The governor to be tested has a speed control unit responsive to a control signal for producing a fuel control signal and an amplifier coupled to the speed control for compensating engine load, and may have a load computer for producing a load signal indicative of engine loading. A voltage controlled oscillator (VCO) in the test apparatus is adapted to be coupled to the speed controller for simulating engine speed as a variable frequency output in response to an input voltage. A summing node is adapted to be responsive to the output of the speed control unit and the load computer for producing a summed input control signal to the VCO. Substitute voltage and current signals are provided as input to the load computer to check the load computer operation. Droop and load-share switches provide means for coupling the output of the load computer to the input of the speed control unit to check the droop and load-share action of the governor. Additional switches provide for testing other functions such as change of frequency and automatic synchronizing. The entire apparatus is contained in one compact portable package and is adaptable to various manufacturer's equipment through the use of adapter-cable assemblies.

11 Claims, 5 Drawing Sheets

APPARATUS FOR BENCH TESTING A GOVERNOR

BACKGROUND OF THE INVENTION

The invention pertains to a testing apparatus. In particular, the invention pertains to an apparatus for testing an engine speed control governor separate from the engine and a connected load.

A governor 10 shown in FIG. 1 is a device for controlling the speed or load of an engine 12 generally by regulating the engine fuel valve relay 13. The engine 12 may be connected to a generator 14 as an engine-generator set 15 for supplying a load 16. The governor 10 operates by sensing the speed of the engine 12, the characteristics of the load 16, or both, and regulating the fuel supplied to the engine 12. The governor 10 includes a load computer (LC) 18 responsive to voltage and current signals from the load 16 and a speed control unit (SCU) 20 responsive to a speed signal from the engine 12. An amplifier 22 responsive to the load signal provides a compensating signal to the speed control unit 20 as illustrated.

The speed control 20 has a plurality of inputs. The speed control unit 20 may be adjusted by speed adjustment potentiometer 24 to a selected operating frequency. Synchronize input 26 is used by a synchronizing apparatus 27 to adjust the engine speed for synchronizing two generators for parallel operation. Generally speaking, the speed control operates over a predesignated range of frequencies which is established by circuitry internal thereof. The speed adjustment potentiometer 24 is used to trim the speed control unit 20 to a particular desired operating frequency. The sync input 26 is employed to change the control point of the speed control unit 20 momentarily in order to adjust the engine and consequently the generator 14 so that the outputs of the generator may be synchronized and matched with other units, the outputs of which may be combined as hereinafter discussed.

Voltage and current signals produced by the generator 14 are coupled to the load computer 18 in the governor 10. These signals are combined to develop a DC voltage proportional to the product of the in phase components of the current and voltage signals. In actual operation, this voltage is proportional to the true electrical load on the generator 14. This signal may be used to slow the engine down as the load increases, a condition known as speed droop.

When an engine-generator set 15 is operated alone, the load computer 18 is normally not utilized. However, if multiple engine-generator sets feed a common load, it is necessary to equalize the load by means of the load computer 18 whereby the load computer signal is fed back to the speed control unit 20 to balance the outputs of each of the generators in use. Speed droop and load sharing action are achieved by using the voltage output of the load computer 18 to modify the control point of the speed control unit 20. Speed droop amplifier 22 connects the output of the load computer 18 to the speed control unit 20. This causes the speed control unit to reduce its output with increasing load.

Troubleshooting and testing of electronic governors is currently done with the governor 10 installed on the engine 12 (on-engine testing) or by testing the governor 10 separate from the engine 12 by means of separate pieces of test equipment (bench testing). When the governor 10 is tested on the engine 12, at least two technicians are required for safety and to accomplish the test procedures. On-engine testing may also require a third person to operate load bank equipment and other functions. Load testing may be inhibited because a load bank is not available. Also, operating the generator 14 under the control of a potentially faulty or defective governor 10 with a live load risks damaging the connected equipment.

Bench testing requires a variety of testing devices which may not always be available. In particular, power resistors, power supplies and oscillators of the proper power rating may not be readily available. Equipment capable of high power testing is also expensive. Also, even when the equipment is available, the tests are limited.

It is therefore desirable to provide a reliable and safe apparatus for bench testing an engine governor which safely simulates speed and load conditions.

SUMMARY OF THE INVENTION

The invention is directed to an apparatus for testing an electronic governor for an engine-generator set. The governor to be tested normally has a load computer, an engine speed control unit (SCU) and a load compensating circuit. The testing apparatus comprises input voltage means for producing a reference voltage input for the SCU corresponding to a desired speed control signal for the engine. A voltage controlled oscillator (VCO) is responsively coupled to the output of the governor and has an output adapted to be coupled to the input of the speed control unit for producing a simulated engine speed input signal. The VCO has a frequency proportional to an input voltage signal and is responsively coupled to an output of the speed control unit in feedback relationship. The VCO is maintained near the frequency proportional to the desired engine speed when the speed control unit is properly functioning. When employed, load voltage and current means produce load voltage and current signals corresponding to a simulation of generator output as a function of the load. The load voltage and current means is adapted to be coupled to the load computer for producing a load simulation signal which is summed with the feedback from the speed control unit to the VCO for further modifying the VCO input. Switch means is coupled to the load compensating circuit for selectively introducing speed compensation to the engine speed control unit from the load computer.

The invention also comprises an apparatus for testing the components of an electronic engine governor having a load computer for producing a load signal indicative of engine loading and a speed control unit responsive to a control signal for providing an engine fuel control signal and an amplifier coupled to the speed control unit for compensating for the engine load. The testing apparatus comprises a voltage controlled oscillator (VCO) adapted to be coupled to the speed control unit for simulating engine speed as a variable frequency output in response to an input voltage. A summing node is adapted to be responsive to the output of the speed control unit and the load computer for providing a control input for the VCO.

DESCRIPTION OF THE INVENTION

Figure 1:
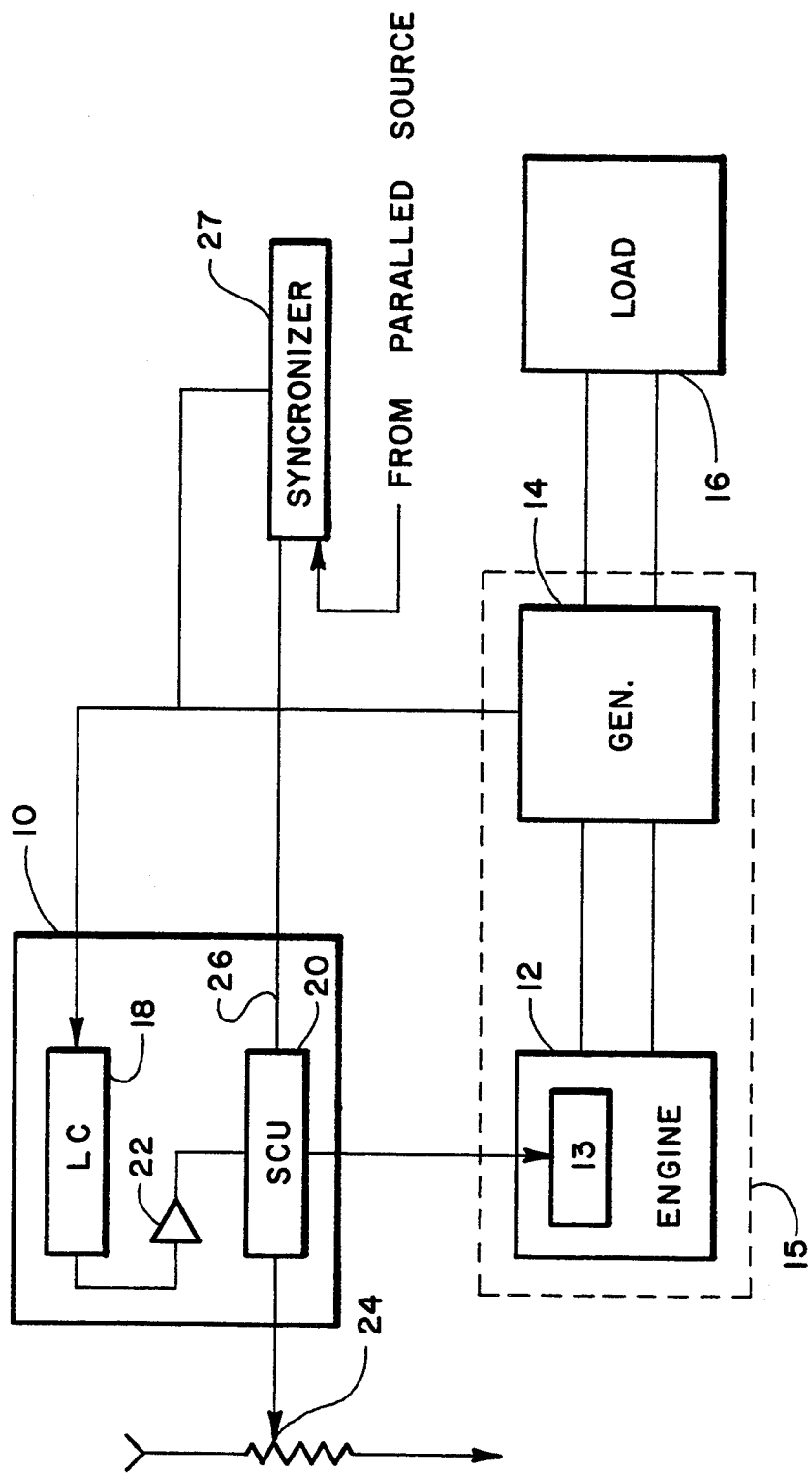
FIG. 1 is a schematic block diagram illustrating a known motor-generator system and a governor controlling the engine speed in response to speed and load signals.
Figure 2:
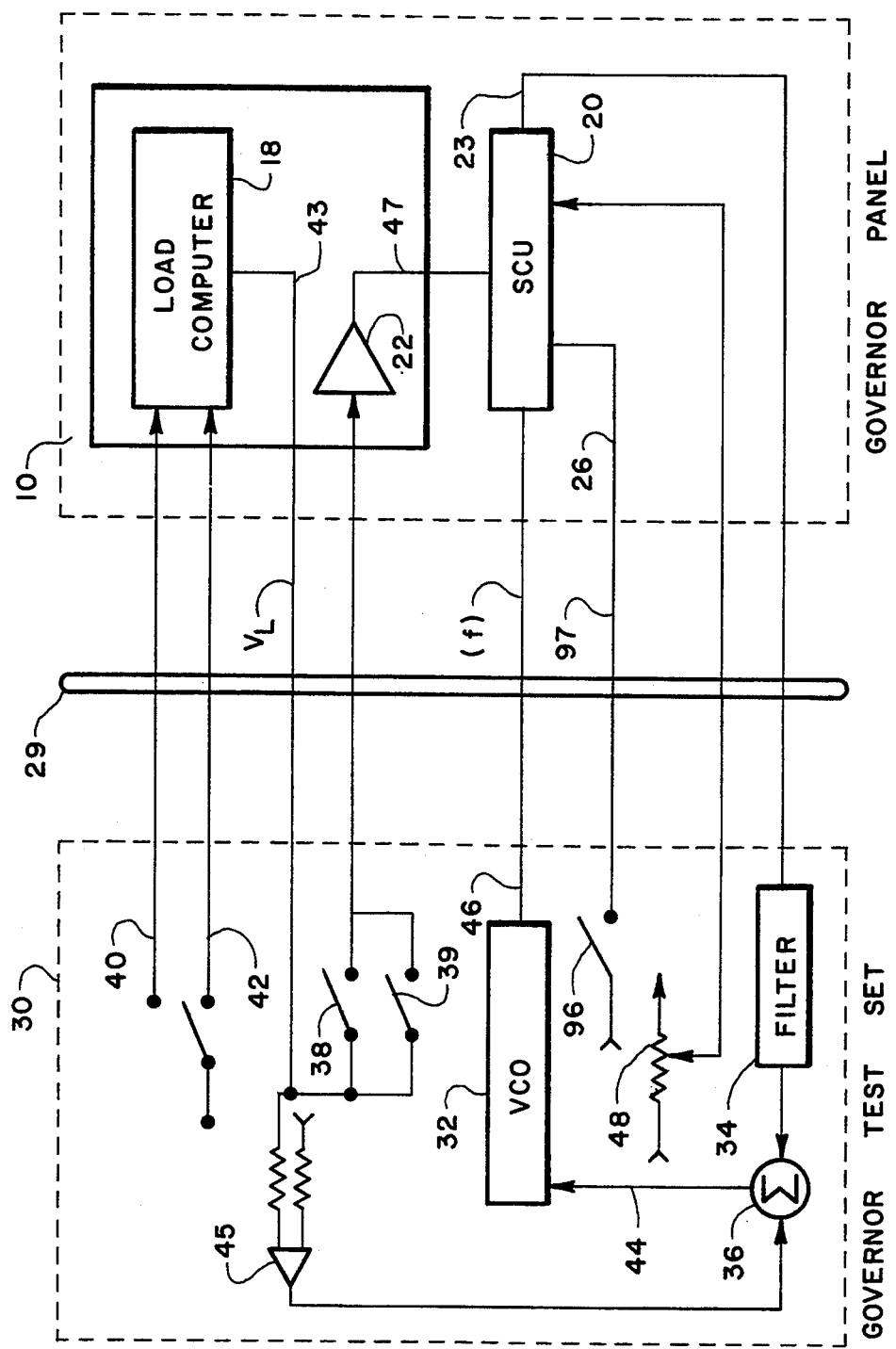
FIG. 2 is a schematic block diagram of a test set in accordance with the present invention for bench testing the governor illustrated in FIG. 1.
Figure 3A:
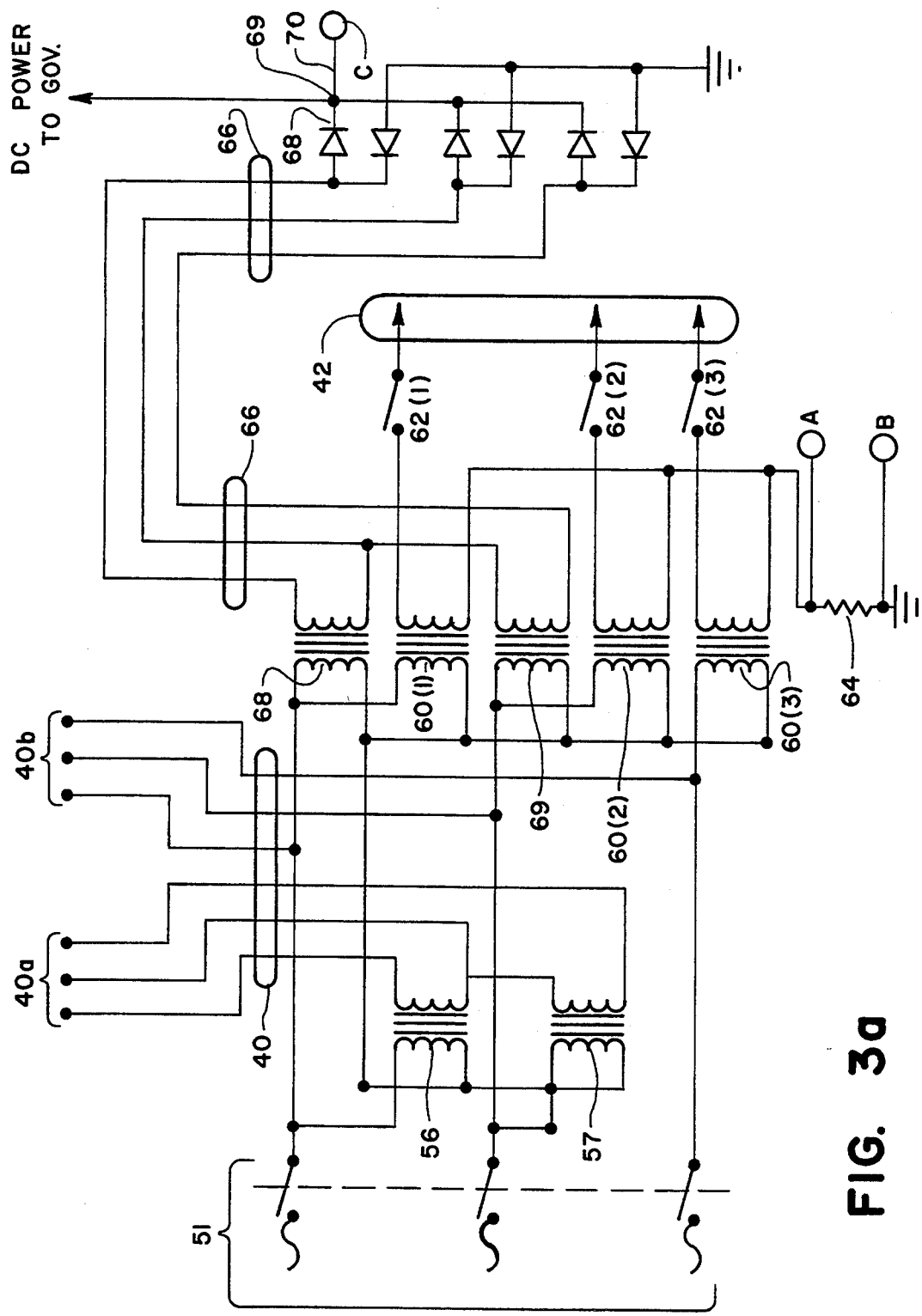
FIGS. 3A and 3B taken together side-by-side form a more detailed schematic diagram of the test set of FIG. 2.
Figure 3B:
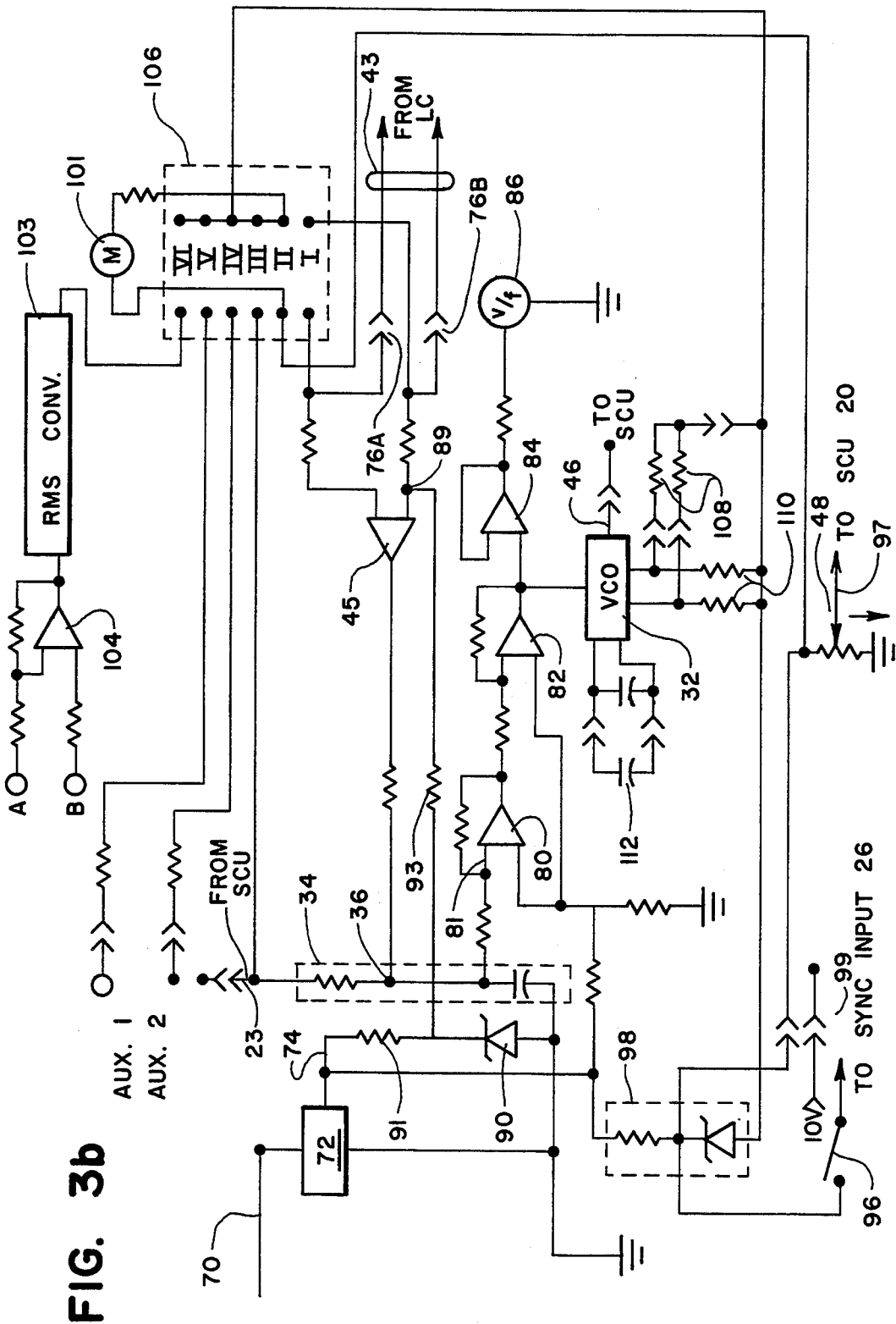
Figure 4A:
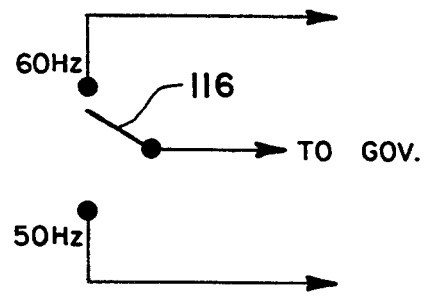
FIG. 4a is a detailed schematic diagram of a frequency selection switch.
Figure 4B:
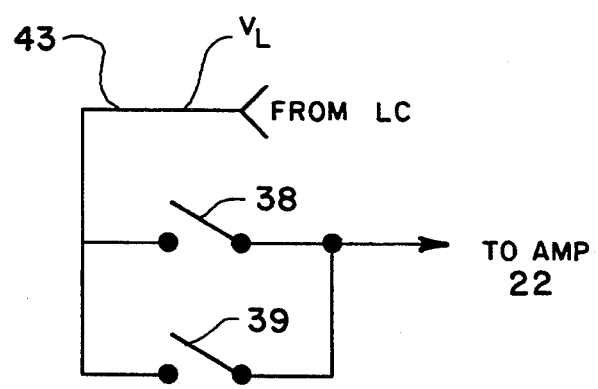
FIG. 4b is a detailed schematic diagram of a droop/load share switch.

The invention illustrated in FIGS. 2 and 3A–3B is directed to a testing system 30 which simulates the operation of the engine-generator set 15 (FIG. 1) operating under the control of the electronic governor 10 to be tested. The block diagram of FIG. 2 shows the interconnections of an embodiment of the testing system 30 with the governor 10 separated from the engine-generator set 15.

Testing of governors of various manufacturer's is facilitated by the design of the interconnecting cable system. Connection to the test set is made by cable 29 which plugs into a connector on the test set. Proper wiring to the governor is assured by using fanning strips to connect to the governor terminals. A separate cable assembly is used for each type of governor or governor submodule to be tested.

The testing system 30 of the invention includes a voltage controlled oscillator (VCO) 32, a filter 34, a summing node 36, a selective speed droop switch 38 and a load share switch 39, a 3 phase voltage signal line 40, a 3 phase current signal line 42 and a speed adjustment potentiometer 48. The VCO 32 has an input 44 and an output 46. VCO 32 operates such that a voltage signal at input 44 results in a corresponding oscillation at a selected frequency (f) on the output 46. The output frequency (f) simulates the speed of rotation of the engine 12 (FIG. 1). The output 46 of the voltage controlled oscillator 32 is connected to the speed control unit (SCU) 20 of the governor 10 under test. The output 23 of the SCU 20 is coupled in feedback relation to the input 44 of the VCO 32 via filter 34 and summing node 36. When the speed control unit 20 is operating properly, it produces a voltage which maintains the VCO 32 at the proper operating frequency called for by the speed adjustment potentiometer 48 (which substitutes for system installed potentiometer 24) just as if it were controlling an actual engine.

Voltage and current signals generated by the testing apparatus 30 represent the response of the generator 14 to a simulated load. The signals are coupled by respective voltage and current lines 40 and 42 to the load computer 18 which develops a differential DC load voltage output $V_L$ on line 43 proportional to the product of the in phase components of the current and voltage signals. In actual operation, the load voltage $V_L$ is proportional to the true electrical load on the generator 14. In the embodiment illustrated, the load voltage $V_L$ is coupled to node 36 by a differential amplifier 45. The output signal $V_L$ of the load computer 18 which is coupled back into the input of the VCO 32 via lines 43, the differential amplifier 45 and the summing junction 36, changes the control point of the VCO 32. This signal is such as to require an increase in control action by the speed control unit 20 as the load signal increases which thereby simulates actual engine loading.

Speed droop and load share action are achieved by sensing a signal proportional to or by using the load voltage $V_L$ to drive the load compensating amplifier 22 which produces a compensating signal for the speed control unit 20 over line 47. The droop switch 38 and the load share switch 39 each connect the output of the load computer 18 to the amplifier 20. The output of the amplifier 22 operates on the speed control unit 20 to cause a reduction in the output signal on line 23 in proportion to the load signal. When properly operating, the VCO frequency should drop in proportion to load voltage $V_L$ when either the droop switch 38 or load share switch 39 is closed.

FIGS. 3A and 3B taken together with FIG. 3A to the left of FIG. 3B forms a schematic diagram illustrating the internal components of the testing apparatus or test set 30 of the present invention. Power is applied to the test set 30 from a four wire 120/208 volt, 3 phase, 50 Hz or 60 Hz AC source 51. In the embodiment illustrated, the input voltage is 208 volts and may be used directly or may be stepped down to 120 volts. Voltage simulation signals are supplied directly to the governor high voltage lines 40A. Alternatively, lower voltage (120 volt) is supplied to the governor over low voltage lines 40B which are fed by a pair of transformers 56 and 57 coupled across the input 51 as shown. Current to the governor's load computer is supplied by output 42 which is coupled to the input 51 via low voltage transformers 60(1), 60(2) and 60(3) and a corresponding series switch 62(1), 62(2) and 62(3). Actual current flow to the governor is monitored by sensing a rectified form of a voltage developed across resistor 64 which is in series relationship with each of the outputs of transformers 60(1)–60(3) and switches 62(1)–62(3). Each phase, e.g. 60(1) must be monitored while the other two switches [62(2), 62(3)] are turned off.

Low voltage power for the various components of the system is supplied via three phase low voltage output 66 and transformers 68 and 69 coupled across the input 51 as illustrated. The low voltage from output 66 is rectified by a diode bridge circuit 67 having output 71 connected to an input 70 of a regulator 72 which produces a regulated output at 74. The output 71 of the bridge circuit 67 is also used to supply the DC operating voltage to the governor under test. Some electronic governors have pulsed outputs to the fuel control valve solenoid 13 (FIG. 1). These pulses are changed to an average DC voltage by the filter circuit 34. The value of the DC voltage from the filter circuit 34 is used to control the VCO 32.

The VCO 32 is coupled to the filter circuit 34 via an amplifier 80 having control input 81 and phase correcting inverter 82. The output 46 of the VCO 32 is coupled to the speed control unit 20 (FIG. 2). The output of the SCU 20 is fed back to the VCO 32 via line 23 and filter 34 to summing node 36. The control voltage of the VCO 32 is coupled by an isolating amplifier 84 to a meter 86 which is calibrated in voltage to frequency as a check on the operation of the VCO 32.

A voltage input from the load computer 18 (FIG. 2) is fed over lines 43 via voltage inputs 76A and 76B to the differential amplifier 45. The output of the differential amplifier 45 is added or summed at node 36 with the speed control output 23 as an input to the VCO 32. A reference input 89 of the differential amplifier 45 is provided with a reference voltage established by a zener diode 90, resistor 91 and resistor 93 coupled to the regulator output 74.

In order to adjust the control point of the SCU 20, the speed set potentiometer 48 (similar to potentiometer 24) is coupled to the SCU 20 via line 97. Resistor and zener diode network 98 provides an alternate 10 V supply to the potentiometer 48. Connector 99 provides the alternate connections depending on the system under test.

In order to test the synchronizer input 26 of the speed control unit 20, a speed sync switch 96 injects a test signal into the synchronizer input 26 of the SCU 20. When the switch 96 is closed, the SCU 20 control point is changed causing a change in VCO frequency. This change in frequency verifies that the governor will respond to a signal to the synchronization input.

To facilitate trouble-shooting, a meter 101 is provided. The meter 101 can be connected through switch 106 to several points in the governor 10. These points include:

I. the output of the load computer via test leads 76A and 76B;
II. the reference voltage supplied to potentiometer 48;
III. the output of the SCU 20;
IV & V. two other points arbitrarily selected on the basis of the design of the particular governor to be tested; and
VI. the current signals 42 supplied to the load computer 18.

A voltage signal developed across resistor 64 is coupled to differential amplifier 104 across terminals A-B. The output of amplifier 104 is converted to a DC voltage (either by a rectifier circuit or an RMS to DC convertor 103 as shown) and is fed to the meter 101 through the switch 106 at position VI.

The broad operating frequency range of the VCO 32 is governed in accordance with biasing resistors 108 and 110 and trimming capacitors 112. The biasing resistors 108 and the trimming capacitors 112 are located in the connector of the interconnecting cable 29 and are selected in accordance with the requirements of the governor under test.

In order to test the droop or load share function of the governor 10, droop switches 38 and load share switches 39 are provided. Closing either switch 38 or 39 will connect the output of the load computer 18 to amplifier 22 in the governor 10 (FIG. 2). In either case, the frequency of the VCO 32 will drop in proportion to the load voltage 43 from the load computer 18 if the SCU 20 is working properly. The droop switch 38 and load share switch 39 are coupled to the amplifier 22 in the governor (FIG. 2). Although only one of each is shown. Depending upon the type of unit being tested, multiple switches may be employed.

Many engine generator sets are designed to operate at either 50 or 60 hertz. Provision for testing the governor 10 at either or both frequencies is conveniently made through the inclusion of switch 116.

The entire apparatus is contained in one compact portable package and is adaptable to various manufacturer's equipment through the use of adapter-cable assemblies.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

What is claimed is:

1. An apparatus for testing an electronic governor for an engine generator set, said governor having a speed control unit and a load computer, the testing apparatus comprising:

an input speed voltage means for producing a reference voltage input to the speed control unit corresponding to a desired speed control signal for the engine;
   a voltage controlled oscillator (VCO) responsively coupled to the output of the governor and having an output adapted to be coupled to the input of said speed control unit for producing a simulated engine speed signal input, said VCO having a frequency proportional to the desired engine speed for setting a control point of said speed control unit and being responsively coupled to an output of the speed control unit in feed back relationship therewith, said VCO being maintained near said frequency when the speed control unit is operative;
   input load voltage and current means for producing input voltage and current signals corresponding to a simulation of the generator output as a function of load, said means adapted to be coupled to the load computer for producing a load simulation signal, said load simulation signal being alternatively coupled to an input of the speed control unit for modifying the control point of the VCO;
   and switch means coupled to an amplifier for selectively introducing droop and load share signals for the speed control unit.

2. The apparatus according to claim 1, further comprising filter means coupled between the output of the speed control unit and the input of the VCO.

3. The apparatus according to claim 1, further comprising a variable speed select means coupled to the input of the VCO for varying the control point thereof.

4. The apparatus according to claim 1, further comprising amplifier means coupled to an input of the VCO, said amplifier for matching the filter output to the input of a VCO.

5. The apparatus according to claim 1, wherein an input voltage current means comprises a differential amplifier responsive to the load computer output.

6. The apparatus according to claim 1, further comprising current monitoring means responsively coupled to an input current means for monitoring current to the load computer.

7. The apparatus according to claim 1, further comprising a sync switch coupled to an input of the speed control unit.

8. The apparatus according to claim 1, wherein a summing node is coupled to the voltage input and the feedback from the speed control unit and at least one of a droop input, speed set input, sync input and load simulation input.

9. The apparatus according to claim 1, wherein interconnecting cables adapt the test apparatus to governors of various manufacture.

10. The apparatus according to claim 9, wherein such interconnecting cables are adapted to minimize connection errors between the test apparatus and the governor to be tested.

11. The apparatus according to claim 1, wherein said apparatus is combined into a single portable package which provides all input signals required to accomplish total operational testing of a governor.

* * * * *